3,322,836
MANUFACTURE OF 2,4,5-TRICHLOROANISOLE
William R. Udell, Overland, Mo., assignor to Monsanto Company, St. Louis, Mo., a corporation of Delaware
No Drawing. Filed Feb. 8, 1963, Ser. No. 257,107
2 Claims. (Cl. 260—612)

This invention relates to the manufacture of 2,4,5-trichloroanisole.

In accordance with this invention it has been found that 2,4,5-trichloroanisole can be conveniently, efficiently and economically manufactured by reacting in an anhydrous system at a temperature in the range of from about 140° C. to about 160° C. and at atmospheric pressure 1,2,4,5-tetrachlorobenzene and sodium methylate in the presence of an inert liquid aliphatic polyether having a boiling point above about 160° C.

While 1,2,4,5-tetrachlorobenzene and sodium methylate theoretically react in equimolecular proportions to provide 2,4,5-trichloroanisole in the process of this invention to increase the rate of reaction an excess of sodium methylate can be used, for example 1 to 1.2 moles per mole of 1,2,4,5-tetrachlorobenzene. The excess when employed in the process of this invention does not enter into the reaction, in other words only one chlorine atom of 1,2,4,5-tetrachlorobenzene is replaceable.

In the process of this invention any inert liquid aliphatic polyether (i.e. any liquid aliphatic polyether which is incapable of reacting with either 1,2,4,5-tetrachlorobenzene or sodium methylate or 2,4,5-trichloroanisole) can be employed provided it has a boiling point above about 160° C. This excludes such materials as the alcohols, the phenols, the mercaptans, the Cellosolves, and the like which have reactive functional groups from the reaction system. The preferred inert aliphatic polyethers are the liquid aliphatic polyethers of the formula $$RO\text{---}(C_nH_{2n}O)_m\text{---}R'$$

wherein $m$ and $n$, respectively, are like or unlike whole numbers from 2 to 4 and wherein R and R' are like or unlike alkyl radicals having from 1 to 3 carbon atoms (e.g. methyl, ethyl, propyl and isopropyl), such as bis-(2-methoxyethyl)ether, bis(2-ethoxyethyl)ether, bis(2-isopropoxyethyl)ether, bis(3-methoxypropyl)ether, bis[2-(2-methoxyethoxy)ethyl]ether, etc. and mixtures thereof. While the amount of the inert organic liquid can vary widely ordinarily 2 to 10 parts by weight will be employed per unit weight of 1,2,4,5-tetrachlorobenzene.

In the process of this invention it is necessary that reaction temperatures above the melting point of 1,2,4,5-tetrachlorobenzene be employed and it has been observed that reaction temperatures in the range of from about 140° C. to about 160° C. provide optimum results.

In the process of this invention the presence of water during the reaction is to be strictly avoided due to its reactivity with sodium methylate.

As illustrative of the process of this invention but not limitative thereof is the following:

EXAMPLE

To a suitable reaction vessel equipped with a thermometer and agitator is charged 36 grams of anhydrous 1,2,4,5-tetrachlorobenzene, 10 parts by weight of anhydrous solid sodium methylate and about 50 parts by weight of anhydrous bis(2-methoxyethyl)ether. At atmospheric pressure the so-charged mass is agitated and heated up to 150° C. over a 15 minute period and then heated at 150° C. for 3 hours. Thereupon the so-heated mass is quenched with an equal volume of cold (about 10° C.) water, and then filtered. The filter cake is then dried under vacuum to give 32.4 parts by weight (92% by weight yield based on the 1,2,4,5-tetrachlorobenzene charged) of 2,4,5-trichloroanisole (melting point 68 to 70° C.).

What is claimed is:
1. The method of making 2,4,5-trichloroanisole which comprises reacting in an anhydrous system at a temperature in the range of from about 140° C. to about 160° C. and at atmospheric pressure 1,2,4,5-tetrachlorobenzene and added solid anhydrous sodium methylate in the presence of a liquid aliphatic polyether of the formula

$$RO\text{---}(C_nH_{2n}O)_m\text{---}R'$$

wherein $n$ is a whole number from 2 to 4, wherein $m$ is a whole number from 2 to 4, and wherein R and R' are alkyl radicals having from 1 to 3 carbon atoms, said polyether having a boiling point above about 160° C., the molar ratio of said reactants being 1 to 1.2 moles of anhydrous sodium methylate per mole of 1,2,4,5-tetrachlorobenzene.

2. The method of making 2,4,5-trichloroanisole which comprises reacting in an anhydrous system at a temperature in the range of from about 140° C. to about 160° C. and at atmospheric pressure 1,2,4,5-tetrachlorobenzene and added solid anhydrous sodium methylate in the presence of bis(2-methoxyethyl)ether, the molar ratio of said reactants being 1 to 1.2 moles of anhydrous sodium methylate per mole of 1,2,4,5-tetrachlorobenzene.

References Cited
UNITED STATES PATENTS
2,803,664    8/1957    Redman _____ 260—612

OTHER REFERENCES
Holleman, Recueil Trav. Chim. des. Pays-Bas, vol. 39 (1920) pp. 736, 737.
Industrial and Engineering Chemistry, vol. 51 (1959) pp. 23A–25A.

BERNARD HEFLIN, *Acting Primary Examiner.*